(12) United States Patent
Deschenes et al.

(10) Patent No.: US 11,622,090 B2
(45) Date of Patent: Apr. 4, 2023

(54) SYSTEM AND METHOD OF WIRELESS COMMUNICATION USING DESTINATION BASED QUEUEING

(71) Applicant: David Clark Company Incorporated, Worcester, MA (US)

(72) Inventors: Brad Deschenes, Dudley, MA (US); Sanjay Gupta, Bedford, MA (US); Nicholas Cannata, Sutton, MA (US)

(73) Assignee: David Clark Company Incorporated, Worcester, MA (US)

( * ) Notice: Subject to any disclaimer, the term of this patent is extended or adjusted under 35 U.S.C. 154(b) by 26 days.

(21) Appl. No.: 16/823,869

(22) Filed: Mar. 19, 2020

(65) Prior Publication Data
US 2020/0314036 A1 Oct. 1, 2020

Related U.S. Application Data

(60) Provisional application No. 62/879,693, filed on Jul. 29, 2019, provisional application No. 62/858,411, (Continued)

(51) Int. Cl.
*H04N 7/15* (2006.01)
*G11B 20/10* (2006.01)
(Continued)

(52) U.S. Cl.
CPC ......... *H04N 7/15* (2013.01); *G11B 20/10527* (2013.01); *G11B 27/005* (2013.01);
(Continued)

(58) Field of Classification Search
CPC ..... H04L 49/201; H04L 47/621; H04L 49/90; H04L 1/0018; H04L 1/0003;
(Continued)

(56) References Cited

U.S. PATENT DOCUMENTS 6,212,206 B1 4/2001 Ketcham
6,651,751 B2 11/2003 Kluczynski
(Continued)

FOREIGN PATENT DOCUMENTS

| GB | 2480821 A | 12/2011 | |
| WO | 2015105970 A1 | 7/2015 | |
| WO | WO-2020222289 A1 * | 11/2020 | ........... H04L 47/225 |

OTHER PUBLICATIONS

ISR and Written Opinion in corresponding PCT application No. PCT/US2020/024389 dated Jun. 12, 2020.

*Primary Examiner* — Deepa Belur
(74) *Attorney, Agent, or Firm* — Burns & Levinson LLP; Steven M. Mills (57) ABSTRACT

A method and system for communication between devices includes connecting a plurality of communication devices through a communication system. At least one communication device acts as a source entity sending a plurality of data packets to an access point. A plurality of communication devices act as destination entities receiving the data packets. The data packets are distributed, by the access point, to the destination entities in such a way that the data packets are queued for receipt by each destination entity in a separate non-interdependent queue.

14 Claims, 4 Drawing Sheets

Related U.S. Application Data filed on Jun. 7, 2019, provisional application No. 62/825,265, filed on Mar. 28, 2019.

(51) Int. Cl.
| | |
|---|---|
| *G11B 27/00* | (2006.01) |
| *H04B 17/318* | (2015.01) |
| *H04L 1/00* | (2006.01) |
| *H04L 12/18* | (2006.01) |
| *H04L 49/201* | (2022.01) |
| *H04L 47/62* | (2022.01) |
| *H04L 49/90* | (2022.01) |

(52) U.S. Cl.
CPC ......... *H04B 17/318* (2015.01); *H04L 1/0003* (2013.01); *H04L 1/0009* (2013.01); *H04L 1/0018* (2013.01); *H04L 1/0057* (2013.01); *H04L 12/1845* (2013.01); *H04L 47/621* (2013.01); *H04L 49/201* (2013.01); *H04L 49/90* (2013.01)

(58) Field of Classification Search
CPC . H04L 1/0009; H04L 1/0057; H04L 12/1845; H04N 7/15; G11B 27/005; G11B 20/10527; H04B 17/318
See application file for complete search history.

(56) References Cited

U.S. PATENT DOCUMENTS

| | | | |
|---|---|---|---|
| 7,373,420 B1* | 5/2008 | Lyon | H04L 47/50 370/229 |
| 9,768,917 B2* | 9/2017 | Taniguchi | H04L 43/0847 |
| 10,318,420 B2* | 6/2019 | Muralimanohar | G06F 12/0811 |
| 2003/0152093 A1 | 8/2003 | Gupta et al. | |
| 2004/0218626 A1 | 11/2004 | Tyldesley et al. | |
| 2005/0021593 A1* | 1/2005 | Fitzgerald | H04L 12/64 709/200 |
| 2007/0147237 A1* | 6/2007 | Haddad | H04L 47/2458 370/412 |
| 2008/0167037 A1* | 7/2008 | Bedekar | H04W 36/005 455/435.1 |
| 2010/0050181 A1* | 2/2010 | Zhang | H04L 67/108 718/104 |
| 2012/0155431 A1* | 6/2012 | Kang | H04L 47/621 370/331 |
| 2013/0208593 A1* | 8/2013 | Nandagopal | H04L 47/266 370/232 |
| 2017/0187641 A1* | 6/2017 | Lundqvist | H04L 47/70 |
| 2017/0332209 A1 | 11/2017 | Awai | |
| 2018/0102965 A1 | 4/2018 | Hari | |
| 2021/0111841 A1* | 4/2021 | Ohta | H04W 28/14 |
| 2021/0378053 A1 | 12/2021 | Saily et al. | |
| 2022/0247687 A1* | 8/2022 | Pelekhaty | H04L 47/30 |

\* cited by examiner

SYSTEM AND METHOD OF WIRELESS COMMUNICATION USING DESTINATION BASED QUEUEING

CROSS REFERENCE TO RELATED APPLICATIONS

This application claims priority to and the benefit of U.S. Provisional Patent Application No. 62/825,265, filed on Mar. 28, 2019, and titled "SYSTEM AND METHOD OF WIRELESS COMMUNICATION USING A DYNAMIC MULTICAST DISTRIBUTION SCHEME", the contents of which are incorporated herein by reference as though fully set forth herein. Further, this application claims priority to and the benefit of U.S. Provisional Patent Application No. 62/858,411, filed on Jun. 7, 2019 and titled "SYSTEM AND METHOD OF WIRELESS COMMUNICATION USING DESTINATION BASED QUEUEING", the contents of which are incorporated herein by reference as though fully set forth herein. Further, this application claims priority to and the benefit of U.S. Provisional Patent Application No. 62/879,693, filed on Jul. 29, 2019 and titled "METHOD AND SYSTEM OF DYNAMIC PLAYBACK VARIATION FOR MULTIMEDIA COMMUNICATION", the contents of which are incorporated herein by reference as though fully set forth herein.

FIELD OF THE TECHNOLOGY

The subject disclosure relates to communication systems and more particularly to the transmission of data packets between communication devices.

BACKGROUND OF THE TECHNOLOGY

Several systems and methods exist today for facilitating real-time communication between a group of devices. In general, (wireless or WiFi) access points can be used to transfer data packets between the devices. At times, one or more of the devices may have a poor connection to the system. As the system attempts to deliver data packets to the devices with poor connections, this can create a delay in data packet delivery to one or more other devices on the system. Since users of the system seek to communicate in real-time, this delay can prove troublesome.

One way to avoid such a delay in packet delivery is in a multicast system where data packets are transmitted to all devices simultaneously and regardless of the connection of any individual device. While this avoids a delay for other users of the system, it results in packet loss for devices any time they have a bad connection. At the very least, this can make communication for all devices on the system difficult, particularly over extended periods of time. Further, not all access points on the market support multicast.

SUMMARY OF THE TECHNOLOGY

In light of the needs described above, in at least one aspect, there is a need for a communication system and method which facilitates real time communication while minimizing system delay and packet loss and is resilient to impairments typically present in a wireless communication system.

In at least one aspect, the subject technology relates to a method of communication between communication devices, including a source entity and a destination entity. The communication devices are connected through a communication system. The source entity sends a plurality of data packets to an access point. The access point distributes the data packets to the destination entities such that data packets are queued for receipt by each destination entity in a separate non-interdependent queue. In some cases, after sending the data packets to the access point and before distributing the data packets, the method can include determining an order for the destination entities. The access point can then distribute the data packets from the separate non-interdependent queues to the destination entities sequentially according to the order.

In at least one aspect, the subject technology relates to a method of communication between communication devices including a source entity and a plurality of destination entities. The communication devices are connected through the communication system for a communication session. The source entity sends a plurality of data packets to an access point. The data packets are arranged in a separate non-interdependent queue for each destination entity. An order is determined for the destination entities. The data packets are then transmitted to the destination entities in at least one transmission cycle. Each transmission cycle includes attempting transmission, for each destination entity, of a number of data packets in the separate non-interdependent queue for said destination entity, the destination entities being served sequentially according to the order until all destination entities have been served. The number of data packets transmitted during each cycle is limited so as not to exceed a set maximum. Attempting transmission of the number of data packets for each destination entity also includes checking whether transmission was successful and, if not, repeating attempting transmission until either transmission is successful or a set transmission count is exceeded.

In some embodiments, if the set transmission count is exceeded, a destination entity to which the transmission of data packets was unsuccessful is marked with a poor coverage flag for a set time period. The poor coverage flag can be removed from the destination entity when a successful transmission is made to said destination entity within the set transmission count. In some embodiments, during the transmission cycle, the order is updated based on a time since each destination entity was last served, with destination entities having a longer time since service receiving a higher priority in the order.

In some embodiments, the destination entities are configured to optionally leave the communication session. The communication system can also be configured to allow new destination entities to optionally join the communication session. The order is then updated anytime a destination entity disconnects from or joins the communication session.

In at least one aspect, the subject technology relates to a communication system connecting a plurality of communication devices for a communication session. The communication devices include a source entity configured to send a plurality of data packets and a plurality of destination entities configured to receive the data packets. An access point is configured to receive the data packets from the source entity and queue the data packets in a separate non-interdependent queue for each destination entity for distribution.

In some embodiments, the communication system is configured to determine an order for the destination entities. The access point can then be configured to distribute data packets from the separate non-interdependent queues to each destination entity sequentially according to the order.

In some embodiments, the access point includes a scheduler configured to determine an order for the destination entities. The access point is then configured to distribute the packets by transmitting the data packets in at least one transmission cycle. Each transmission cycle includes the access point attempting transmission, for each destination entity, of a number of data packets in the separate non-interdependent queue for said destination entity. The destination entities are served sequentially according to the order until all destination entities have been served. The number of data packets transmitted to a destination entity during a transmission cycle does not exceed a set maximum. Attempting transmission of the number of data packets to each destination entity includes checking whether transmission was successful and, if not, repeatedly attempting transmission until either transmission is successful or a set transmission count is exceeded.

In some embodiments, the communication system is thither configured such that if the set transmission count is exceeded, the communication system marks a destination entity to which the transmission of data packets was unsuccessful with a poor coverage flag for a set time period. The poor coverage flag can be removed from a destination entity when a successful transmission is made to said destination entity within the set transmission count.

In some embodiments, the access point is configured to update the order based on a time since each destination entity was last served, with destination entities having a longer time since service receiving a higher priority in the order. In some cases, the destination entities can be configured to optionally leave the communication session. The communication system can be configured to allow new destination entities to optionally join the communication session. The order can then be updated anytime a destination entity disconnects from or joins the communication session.

BRIEF DESCRIPTION OF THE DRAWINGS

So that those having ordinary skill in the art to which the disclosed system pertains more readily understand how to make and use the same, reference may be had to the fallowing drawings.

DETAILED DESCRIPTION

The subject technology overcomes prior art problems associated with real-time data packet transfer within a communication system. In brief summary, the subject technology provides a system that reduces the number of data packets lost (lost packets being those that cannot be delivered to the designated destination within a pre-specified time period) while still facilitating real-time communication between devices. The advantages, and other features of the systems and methods disclosed herein, will become more readily apparent to those having ordinary skill in the art from the following detailed description of certain preferred embodiments taken in conjunction with the drawings which set forth representative embodiments of the present invention. Like reference numerals are used herein to denote like parts. Further, words denoting orientation such as "upper", "lower", "distal", and "proximate" are merely used to help describe the location of components with respect to one another. For example, an "upper" surface of a part is merely meant to describe a surface that is separate from the "lower" surface of that same part. No words denoting orientation are used to describe an absolute orientation (i.e. where an "upper" part must always be on top).

In general, both wired and wireless devices described herein are engineered to withstand rugged environments while still being user friendly. The high cost of rugged products can be a barrier of entry in certain markets. As such, the systems herein utilize the built in wireless capabilities of smart devices, as well as their ubiquitous nature and broad availability in today's society, in order to decrease the cost of entry for users of the system.

Figure 1:
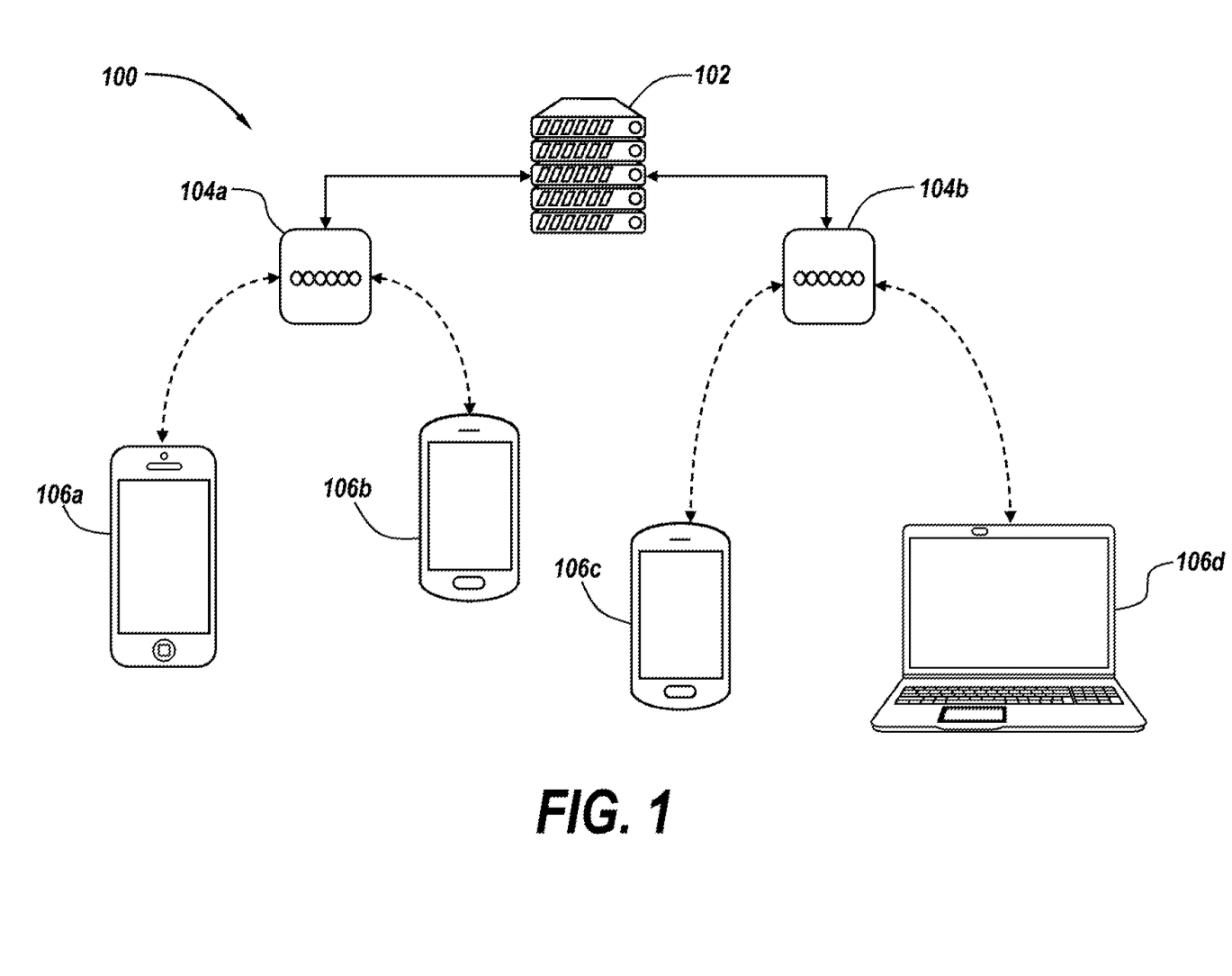
FIG. 1 is a schematic diagram of an exemplary communication system.

Referring now to FIG. 1, a schematic diagram of an exemplary system 100 which can implement the subject technology is shown. The system 100 includes a host 102, which is a senor running a host application to allow wireless real-time, full duplex, multi-party, multimedia communication between communication devices. The host server can be physical hardware or software based. The server manages all communication device 106a-106d (generally 106) connections and may also provide multimedia mixing. Notably, the host 102 is just one exemplary way to manage communication devices 106 and is not always a necessary component of the subject technology. Further, while various exemplary components are shown as part of the system 100, it should be understood that the subject technology is applicable in a number of substantially real-time systems which involve the transfer of data packets for audio and/or video, such as communication, streaming, gaming, and the like.

Two access points 104a, 104b (generally 104) facilitate communication between the server 102 and four communication devices 106 for carrying out a communication session. In general, the access points 104 control distribution of the data packets across the communication devices 106. The access points 104 are networking devices which connect the communication devices 106 to the host 102 server during a communication session. The access points 104 transmit and receive data to and from the communication devices 106 using a wireless local area network technology, for example WiFi 802.11 standard, and route traffic as needed utilizing specified transportation methods including IP transport.

The communication devices 104 can be any device used for communication, such as a smartphone(e.g. 106a-106c) or laptop (e.g. 106d). For example, a typical communication device 106 can be a smartphone running an OS or Android operating system. The communication devices 106 run software which allows the communication devices 106 to connect to the system 100, provides a user interface, and allows for the transmission and receipt of multimedia data. The communication devices 106 can leave or join a given communication session on the system 100 per user demand. The number of access points 104 and communication devices 106 shown is exemplary only and it should be understood that the system 100 only requires at least one access point 104 and at least two communication devices 106 to operate.

During a given communication session, data packets containing at least one type of media content are transmitted between the devices 106. For example, the data packets can include data related to audio and/or video. At least one communication device 106 configured to act as a source entity and send data packets. All of the communication devices 106 on the system are configured to act as destination entities and receive the data packets sent from the source entity. While the system 100 only requires one source entity, in some cases, many, or all of the communication devices 106 can be configured to act as both destination and source entities, allowing duplex communication between all of the devices 106. As an example, the communication devices 106 could include several cell phones and laptops, all of which are capable of sending and receiving audio and video between one another over the system 100. All communication devices 106 are linked up to the system 100 through a link to an access point 104, which is often wireless but can also be wired for one or more devices 106.

The system 100 can also include other equipment, not distinctly shown in FIG. 1, to enable communication between the devices 106. For example, the system 100 can include routers to allow the communication devices 106 to wirelessly connect to the host 102 via the access points 104. Data is thereby transmitted wirelessly between the access points 104 and the devices 106. The host 102 server is normally connected to the access points 104 by a physical wire. Therefore the router can translate data packets from the wired protocols to wireless, and vice versa.

The system 100 can also include a switch or a hub. If it is desirable to connect the host 102 server to existing network infrastructure, a switch allows for multiple wired connections between the host 102 and the rest of the existing infrastructure. Additionally, or alternatively, the system 100 can be connected to other systems 100, or other associated devices and systems, such as radio network layers for 2-way radio, intercom systems, and/or cellular systems.

A Dynamic Host Configuration Protocol (DHCP) server may be used to assign IP addresses to the host 102 server and connected wireless devices 106. The 802.11 WiFi standard is utilized for all wireless transmission of data, including multimedia, between the host 102 and communication devices 106. This standard is used as many existing smart devices already comply with the standard, allowing easy deployment of the system 100 as well as the ability to use off-the-shelf hardware to expand coverage of the system 100 based off of a custom application (e.g. a particular user's application). In the example of FIG. 1, the host 102 is part of a local infrastructure which the communication devices 106 connect to through access points 104. However, in other arrangements, the host 102 will contain a WiFi access point. In that case, utilization of the separate access point is optional if a WiFi infrastructure is already present, where a completely local and dedicated intercom system is desired. Notably, the physical implementation of the system 100 has many permutations. For example, the access point 104, server software, DHCP server, router, and switch could all be one piece of hardware with all the necessary software running on it, all discrete devices, or any combination within these two extremes.

In some embodiments, all communication devices 106 on the system 100 can transmit and receive on the safe multicast address. Traffic from the communication devices 106 can then be routed through an access point 104 to all other communication devices 106 connected to that access point 104 without routing the traffic through a separate host 102. If communication devices 106 within the system 100 are connected to separate access points 104, the traffic between those communication devices 106 can be routed directly between the separate access points 104 to facilitate communication between the communication devices 106 connected to each access point 104. Again, the traffic need not to be routed through the host 102 between the access points 104, and can instead be routed directly between access points 104. In this approach, the host 102 need not handle all multimedia mixing. Control data packets can be sent from the host 102 to the individual communication devices 106, and each communication device 106 can handle mixing and discarding of incoming data packets at the application level of communication device 106.

Figure 2:
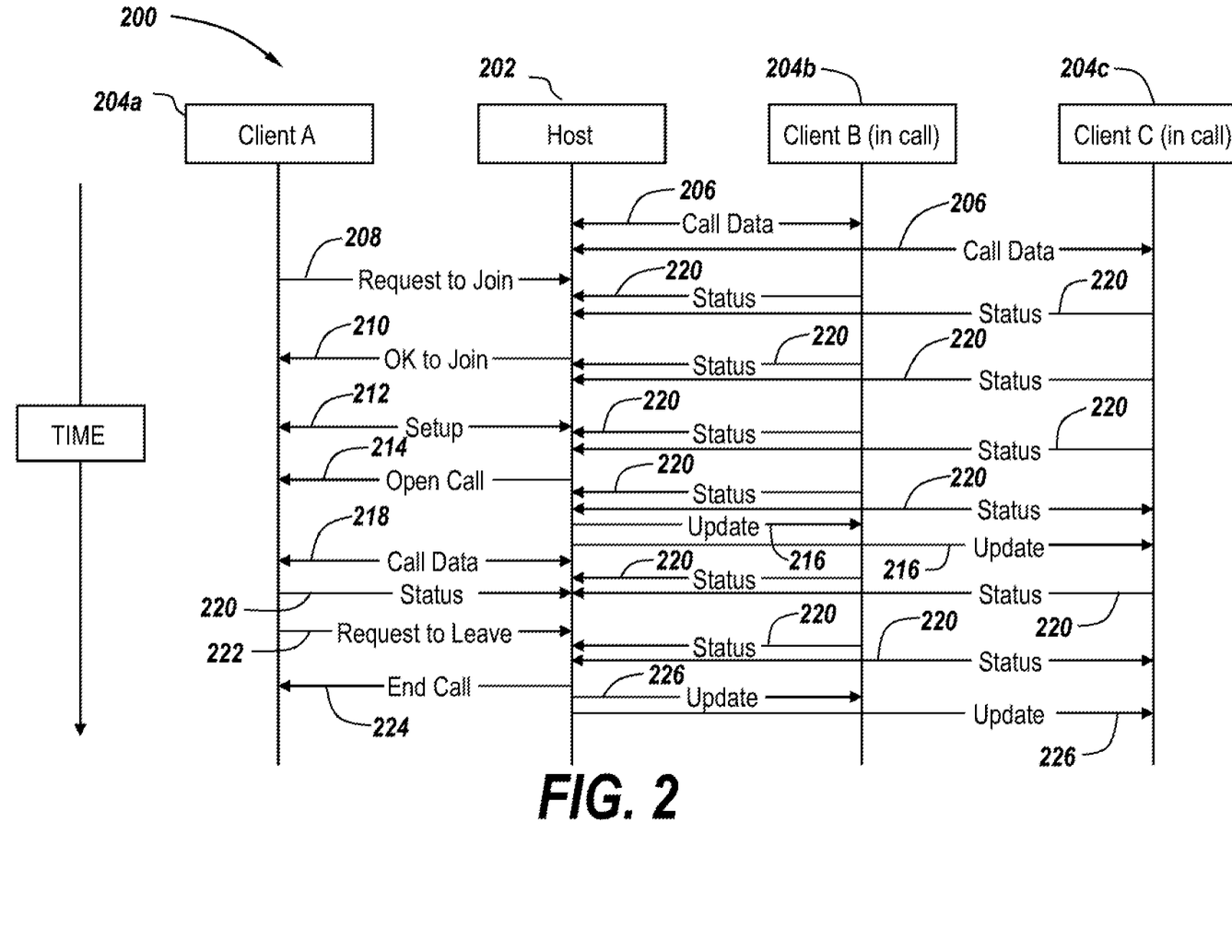
FIG. 2 is a diagram of an exemplary communication session taking place on an exemplary communication system.

Referring now to FIG. 2, an exemplary communication session is shown generally at 200. The session includes a host 202, which is in wireless communication with entities or clients 204a-204c (generally 204) which are communicating. Note that the terms entities and clients are used interchangeably with communication devices. Actions taking place during the communication session over time are represented linearly, with actions closer to the beginning of the communication session represented by the higher up lines with respect to FIG. 2. It should be understood that all times shown for actions are rough and exemplary only.

At the start of the portion of the session shown, clients 204b and 204c are already part of the communication session and communicating via the host 202. As the clients 204b and 204c communicate, data packets, including any media content being transmitted between the clients 204b, 204c, are sent to the host 202. The host 202 then mixes the data for the clients 204b, 204c which are part of the communication session and sends out a (generally multicast) stream to clients 204b, 204c that have joined the session. To that end, clients 204b and 204c are exchanging call data 206 with the host 202. For ease of illustration, this is shown at slightly different times, but it should be understood both clients 204b, 204c will continue to transmit call data, after joining, over the course of the communication session unless they leave.

Initially, client 204a has not joined the session and is not communicating with the other clients 204b, 204c. New clients that are wirelessly connected to the system, such as client 204a may also join a communication session at any time. Clients that are part of a call session, such as clients 204b and 204c, may also leave at any time. Clients joining or leaving a call session does not disrupt the system.

Client 204a eventually requests to join the communication session at line 208, Client 204a receives confirmation that it is cleared to join the session at line 210. Line 212 represents setup data being exchanged between the host 202 and the client 204a, and then a call is opened with client 204a (line 214) which becomes a part of the communication session. The host 202 handles all of the initial back and forth relating to call setup. RTP and RTCP protocols can be used at the Application layer (i.e. of the OSI network) to manage the session and the data transmitted over the system. Clients 204b and 204c are then updated, at line 216, to reflect that client 204a is part of the communication session. Client 204a can then send and receive data packets over the system during the communication session (line 218).

Periodically, status packets are also transmitted between the clients 204 within the communication session and the host 202 (represented by lines 220). The status packets can include control traffic relating to communication metrics of the system (e.g. control information) and can be relied upon to measure system performance. An exemplary status packet can include, for example, a packet ID number, the number of the last packet sent, an access point MAC address, and GPS coordinates (if available). Eventually, client 204a decides to leave the system and a request to leave is sent to the host 202 at line 222. The host 202 then removes client 204a from the communication session at line 224. Clients 204b and 204c are then updated, at lines 226, that client 204a has left the session. In this way, a communication session is carried out over the system.

Since the communication session is taking place in real time, problems can arise when one client 204 has a poor connection with the system. For example, if client 204a transmits data packets and client 204b has a poor connection, the poor connection of client 204b can disrupt distribution of data packets by the system, as the system tries repeatedly to transfer data patents to client 204b. As described in more detail below, the subject technology seeks to optimize the performance of the system with respect to these issues.

Figure 3:
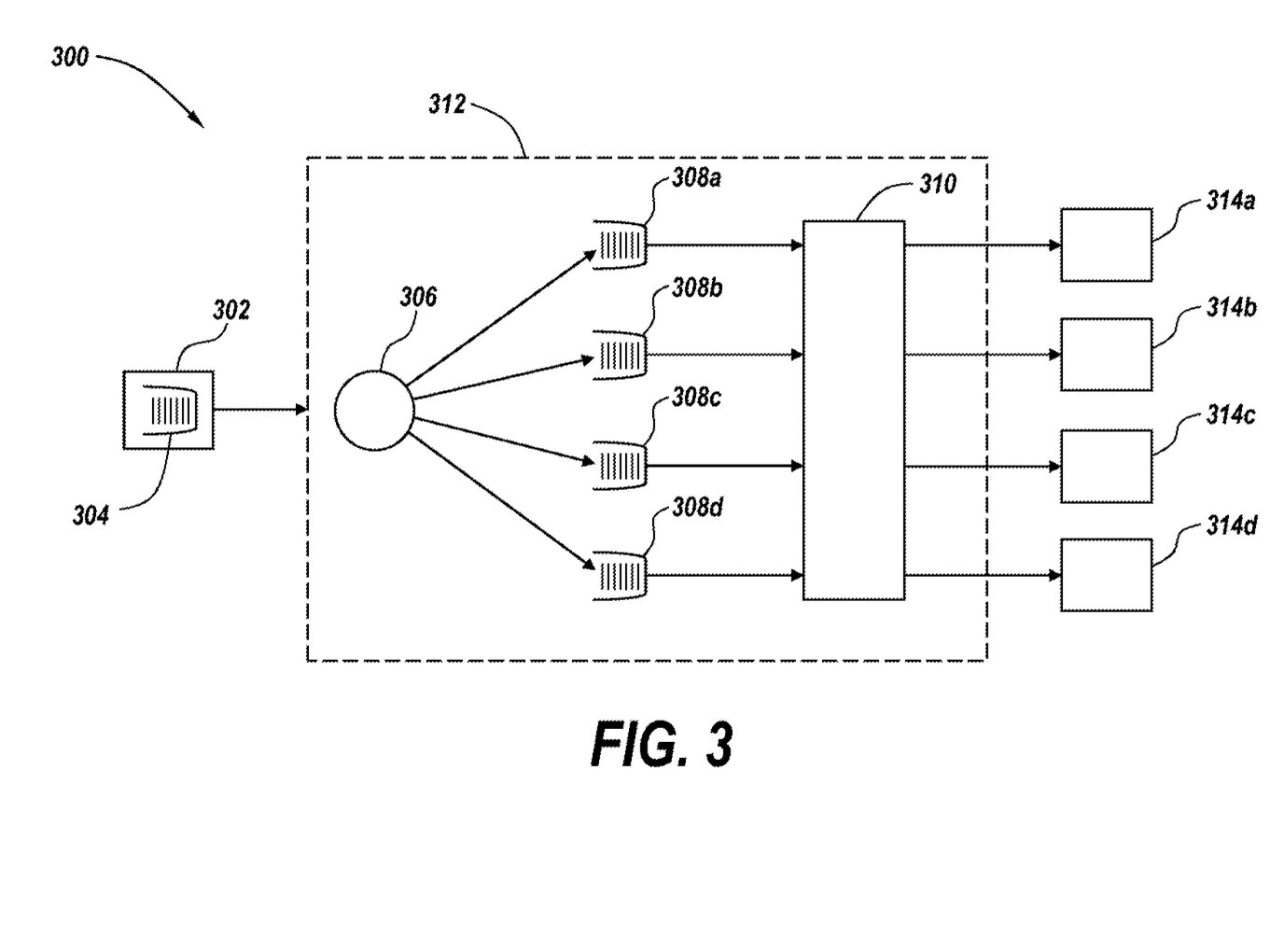
FIG. 3 is an exemplary schematic diagram of a system in accordance with the subject technology.

Referring now to FIG. 3, an exemplary schematic diagram of a system 300 in accordance with the subject technology is shown. The system includes a plurality of connected communication devices 302, 314a-314d with one acting as a source entity (communication device 302) and a plurality acting as destination entities (communication devices 314a, 314b, 314c, 314d, generally 314). The source entity 302 sends a plurality of data packets 304 to an access point 312 which eventually transmits the data packets 304 to the destinations entities 314. As discussed above, while a given communication device may act as a source entity for a particular transfer of data packets, all of the communication devices 302, 314 are generally capable of acting as source entities, and transmitting data packets to the other communication devices 302, 314. Conversely, all devices 302, 314 which act as source entities can also act as destination entities and receive data packets transferred by other communication devices 302, 314 at different times. The access point 312 includes a processing module 306 which includes a processor and memory and is capable of carrying out instructions. The access point 312 also typically includes a transceiver (not distinctly shown) with transmitting and receiving capabilities, allowing the access point 312 to wirelessly transmit and receive data packets between the communication devices 302, 314.

After data packets 304 are sent to the access point 312, the access point 312 queues the data packets into separate non-interdependent queues 308a, 308h, 308c, 308d (generally 308) for each respective destination entity 314a, 314b, 314c, 314d. Four destination entities 314 are shown by way of example, although any plurality of destination entities 314 could be used in other embodiments. The queues 308 are separate in that a different queue 308 provided for each destination entity 314. Further, the queues 308 are non-interdependent in that data packets are distributed from one queue 308, to the destination entity associated 314 with that queue 308, regardless of whether data packets are being distributed to the destitution entities 314 associated with other queues 308. In other words, transmission of the data packets in each queue 308 to a respective destination entity 344 is attempted irrespective of whether data packets are successfully transmitted from other queues 308 to other destination entities 314. Since there are four destination entities 314, four queues 308 are created by the access point 312. A first queue 308a is associated with a first destination entity 314a, a second queue 308b is associated with a second destination entity 314b, a third queue 308c is associated with a third destination entity 314c, and a fourth queue 308d is associated with a fourth destination entity 314d.

The data packets are then distributed from each queue 308 to each destination entity 314. In some cases, a scheduler 310 determines the order in which queues 308 are served and data packets distributed therefrom. A simple way to distribute packets from each queue 308 is a round robin approach, where a certain number of data packets are transmitted (i.e. attempted to be distributed) from each queue 308. For example, one data packet could be transmitted from the first queue 308a to the first destination entity 314a. After successful transmission, the data packets can then be removed from the queue 308a for that entity 314a and deleted from the corresponding memory within the access point 312. After the first destination entity 314a has been served in this way, one data packet could be transmitted from the second queue 308b to the second destination entity 314b, and so on, until a cycle is complete and distribution of a data packet to each destination entity 314 has been attempted from their respective queue 308. If five data packets were queued for each destination entity 314, five cycles through this process could result in distribution of all data packets that were queued. However, if one or more of the destination entities 314 had a bad connection, then transmission of one or more data packets to that entity 314 during the distribution cycle may not have been successful, meaning one or more data packets may have not been successfully distributed. More distribution cycles can then be attempted until all data packets in the queues 308 have been distributed to each destination entity 314, except for destination entities 314 which have persistent bad connections to the system. The system can attempt a set number of cycles before determining what action to take as a result of the bad connection, such as discarding data packets from the queue associated with said entity 314.

In some cases, after the data packets have been divided into queues 308, a scheduler 310 can determine an order in which the destination entities 314 will be served during each transmission cycle. The access point 312 can then distribute the queues 308 of data packets sequentially, according to the order. The order can be based on user defined criteria for a specific communication device priority, or in some cases, can be set automatically according to simple criteria such as when a device joins the communication session or randomly. The distribution order set by the scheduler 310 can then be relied upon during each transmission cycle to determine the priority of data packet distribution. Notably, while the scheduler 310 and queues 308 are shown as separate from the processing module 306 in the example given, it should be understood that one module, such as one processor with associated memory, within the access point 312 can generate queues 308 and act as the scheduler 310, these being shown as separate in the diagram 300 for explanatory purposes only.

Figure 4:
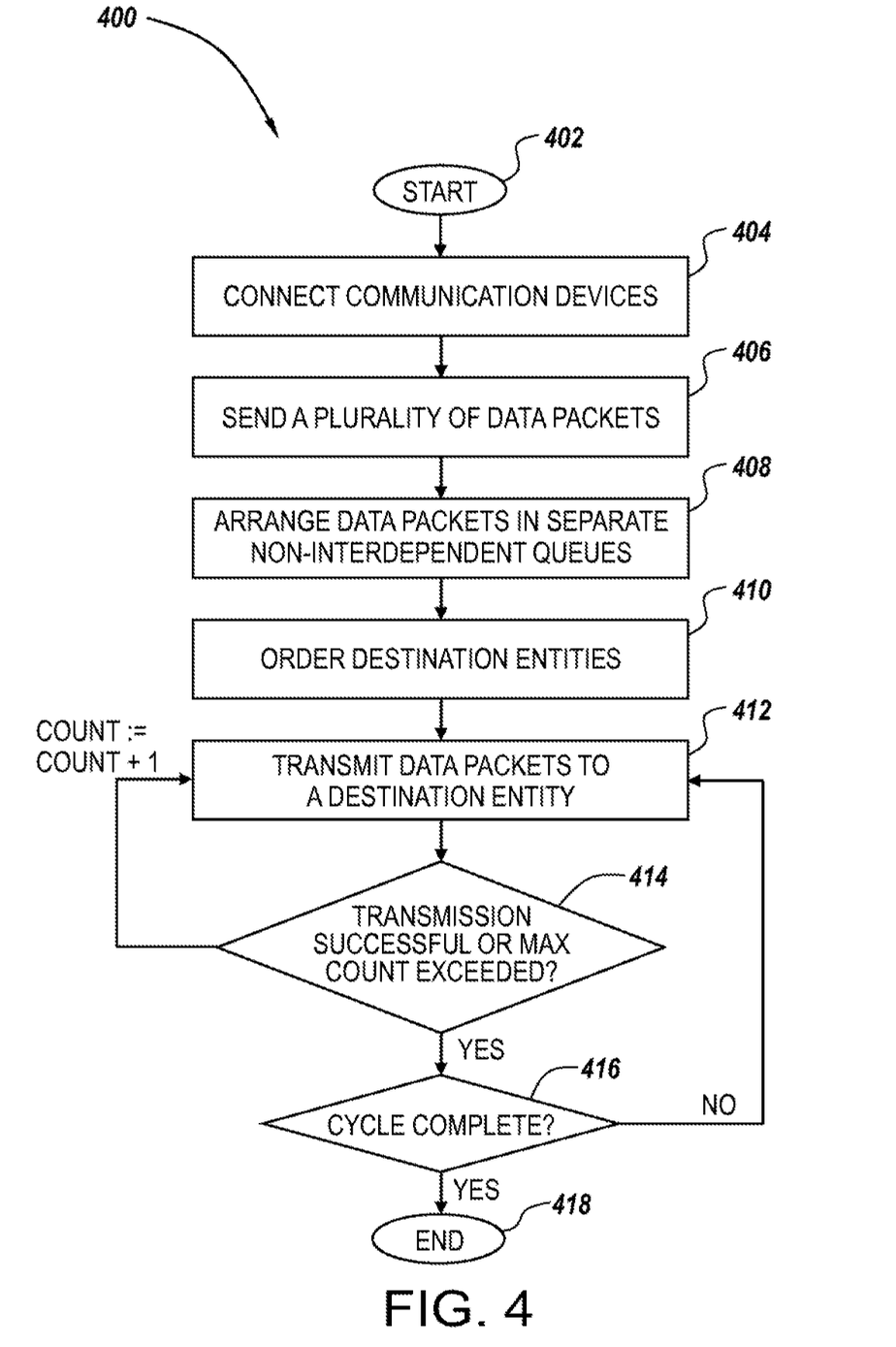
FIG. 4 is a flowchart of a method in accordance with the subject technology.

Referring now to FIG. 4, a flowchart of a method 400 in accordance with the subject technology is shown. The method 400 represents the transmission of one or more groups of data packets between devices, and can be carried out one or more times over a given communication session, as discussed in more detail below.

First, the method starts at step 402. Communication devices are connected through a communication system at step 404, such as via an access point (or multiple access points) as discussed above. To carry out the method 400 in accordance with the subject technology, at least one of the communication devices must act as a source entity sending data packets while multiple communication devices act as destination entities receiving data packets. However, it should be understood that in some cases, all communication devices are capable of sending and receiving data packets, and are capable of acting as source or destination entities. In any case, at step 404, the communication devices are connected to the communication system and are participating in a communication session which allows for the exchange of multimedia data between the devices.

At step 406, the source entity (or several source entities) sends data packets to the access point for eventual distribution to a number of destination entities. The access point then arranges the data packets, at step 408, into separate non-interdependent queues for each destination entity that the packets will be transmitted to.

The data packets now need to be served to each destination entity from their respective queue. As discussed above, there are many ways of doing so. In any case, at step 410, an order is determined for how the packets will be distributed (i.e. which destination entity will be served when, with respect to other destination entities). As discussed above, this order can be random, or according to a desired distribution scheme, such as by giving a certain priority to each device on the system. In some cases, the order can be optionally updated at various points throughout the method 400. In fact, the order can be changed at any time, especially since communication devices nary join or leave the session, the quality of the link for one or more devices may change, or some other relevant parameter may dictate a desire to change the order. For example, at the start of a transmission cycle beginning at step 412, the system can examine which entities have had a longer time since service (i.e. a longer time since data packets were distributed to them) and destination entities having a longer time since service can receive a high priority within the order. Further, in some cases, communication devices are capable of optionally leaving (disconnecting from) or joining the communication session and the order can be updated anytime a communication device disconnects from or joins the communication session.

At steps 412-416, a transmission cycle is completed. In a given transmission cycle, transmission of a number of data packets not exceeding a set maximum is attempted to each destination entity according to the order until all destination entities have been served (i.e. until transmission has been attempted to each destination entity). The set maximum can be determined by a user, or preprogrammed into the system based on a desired number of data packets to be distributed each cycle. The transmission cycle process starts, at step 412, by transmitting data packets to a destination entity from the queue for said entity. The first time step 412 is carried out during a given cycle, the data packets will be transmitted to the destination entity that is ranked highest within the order. As part of this process, the system can check whether the data packets were successfully transmitted. Therefore, at step 414, the system can be programmed to reattempt transmission if transmission was unsuccessful. Typically, reattempts at transmission can be limited to a set count, such as three attempted transmissions, before the system abandons additional attempts at retransmission. Thus, the system counts the number of transmissions, and reattempts step 412 until either the transmission is successful, or the set count is exceeded (for transmission to that destination entity during that cycle), whichever comes first.

Notably, at step 414, if the set count is exceeded this represents a number of unsuccessful transmissions of data packets to a given destination entity. Therefore if the set count is exceeded, the system can mark said destination entity with a poor coverage flag for a set time period. The poor coverage flag can expire after the set time period, or, if transmission of data packets to that destination entity is successful during a subsequent transmission cycle, the poor coverage flag can then be removed.

To complete a cycle, transmission is attempted to each destination entity which is connected to the communication session. As such, at step 416, the system examines whether the transmission cycle is complete. If transmission of the queued data packets has not been attempted to one of the destination entities, the method 400 proceeds back to step 412, and steps 412-414 are carried out for the subsequent destination entity in the order. When steps 412-414 have been completed for every destination entity, the transmission cycle is complete. However, there may still be data packets left to distribute, since the number of data packets distributed to a given destination entity during each transmission cycle is limited to the set maximum number of data packets. As such, distribution of all the queued data packets may require multiple cycles to complete. This can be accomplished by repeating steps 412-416 to transmit additional data packets according to one or more additional cycles.

After distribution of the queued data packets to each destination entity is complete (or transmission of the data packets has been attempted and unsuccessful), the process 400 ends at step 418. Step 418 represents a completion of the process 400 of transmitting a batch of data packets from the source entity to the destination entities. This does not necessarily represent the end of a communication session, although a user controlling the system could choose to end the session at this time if desired, or individual users could disconnected their communication devices from the session. Instead, the system waits for additional data packets to be sent out by a device. Once a device sends out data packets for distribution by the system, the process 400 can again be carried out, starting at step 406 (step 406 being the starting point when initiation of a new communication session is not needed, and all devices remain connected to the communication session). If the communication session was closed and/or devices need to be once again connected to the system, the entire process can be restarted at step 402.

One example of a cycle, in accordance with steps 412-416 is now provided. During a given cycle, each communication device might have, for example, ten data packets in its queue. The set maximum number of data packets can be set to two. Therefore, during the cycle of steps 412-416, distribution of the first two of the ten data packets is attempted to a first communication device with the highest priority within the order. Assuming transmission is successful, the system moves on and transmission of two data packets is attempted to the second communication device with the second highest priority within the order (i.e. step 412 is carried out for the second device in the order). Again assuming a successful transmission, this is repeated for each communication device acting as a destination entity within the communication session. In this way, the first two of the ten data packets are distributed to each destination entity according to the set order. This process is then repeated in a second cycle, repeating steps 412-416 for the next two data packets, and so on, until all ten data packets have been distributed, assuming transmission is successful during each cycle.

Of course, if transmission is unsuccessful, additional cycles might be required to complete transmission of the data packets. Alternatively, the method 400 can include a step of dropping queued packets for destination entities which are not successfully receiving them. This allows new data packets to be queued up for nearly immediate transmission to those destination entities, rather than causing the new data packets to queue up behind a potentially long line of existing data packets. While some data packets are lost for the failed transmission to those destination entities, this method allows the destination entities to start participating in the communication session substantially in real time once their connection to the system is restored (or other factors causing poor data packet distribution are resolved).

All orientations and arrangements of the components shown herein are used by way of example only. Further, it will be appreciated by those of ordinary skill in the pertinent art that the functions of several elements may, in alternative embodiments, be carried out by fewer elements or a single element. Similarly, in some embodiments, any functional element may perform fewer, or different, operations than those described with respect to the illustrated embodiment. Also, functional elements (e.g. servers, communication devices, etc.) shown as distinct for purposes of illustration may be incorporated within other functional elements in a particular implementation.

While the subject technology has been described with respect to preferred embodiments, those skilled in the art will readily appreciate that various changes and/or modifications can be made to the subject technology without departing from the spirit or scope of the subject technology. For example, each claim may depend from any or all claims in a multiple dependent manner even though such has not been originally claimed. Additionally, the subject technology includes methods of carrying out the functions of the system as described herein.

What is claimed is:

1. A method of communication between communication devices comprising:
    a) connecting, through a communication system, a plurality of communication devices including a plurality of source entities and a plurality of destination entities via a local area network;
    b) sending, by the source entities, a plurality of data packets to a local area network access point using the local area network; and
    c) distributing the data packets, by the local area network access point, to the destination entities using the local area network such that the plurality of data packets from the source entities are queued, at the local area network access point, for receipt by each destination entity in a separate non-interdependent queue, wherein:
    packets are distributed from each of the separate non-interdependent queues irrespective of both: the existence of data packets within others of the separate non-interdependent queues; and successful transmission of data packets from others of the separate non-interdependent queues; and
    each separate non-interdependent queue is associated with a single destination entity.

2. The method of claim 1, further comprising:
    b1) after step b) and prior to step c), determining an order for the destination entities,
    wherein, in step c), the local area network access point distributes the data packets from the separate non-interdependent queues to the destination entities sequentially according to the order.

3. A method of communication between communication devices comprising:
    a) connecting, through a communication system, a plurality of communication devices including a plurality source entities and a plurality of destination entities for a communication session via a local area network;
    b) sending, by the source entities, a plurality of data packets to the local area network access point;
    c) arranging, at the local area network access point, the plurality of data packets from the source entities in a separate non-interdependent queue for each destination entity;
    d) determining an order for the destination entities; and
    e) transmitting, using the local area network, the data packets to the destination entities in at least one transmission cycle, each transmission cycle including attempting transmission, for each destination entity, of a number of data packets in the separate non-interdependent queue for said destination entity, the destination entities being served sequentially according to the order until all destination entities have been served, the number of data packets not exceeding a set maximum, wherein, attempting transmission of the number of data packets for each destination entity includes checking whether transmission was successful and, if not, repeating attempting transmission until either transmission is successful or a set transmission count is exceeded,
    wherein:
    transmission of the data packets from each of the separate non-interdependent queues occurs irrespective of both: the existence of data packets within others of the separate non-interdependent queues; and successful transmission of data packets from others of the separate non-interdependent queues; and
    each separate non-interdependent queue is associated with a single destination entity.

4. The method of claim 3, wherein if the set transmission count is exceeded, a destination entity to which the transmission of data packets was unsuccessful is marked with a poor coverage flag for a set time period.

5. The method of claim 4, wherein the poor coverage flag is removed from a destination entity when a successful transmission is made to said destination entity within the set transmission count.

6. The method of claim 3, wherein, during step e), the order is updated based on a time since each destination entity was last served, with destination entities having a longer time since service receiving a higher priority in the order.

7. The method of claim 3, wherein:
    the destination entities are configured to optionally leave the communication session;
    the communication system is configured to allow new destination entities to optionally join the communication session; and
    the order is updated anytime a destination entity disconnects from or joins the communication session.

8. A communication system comprising:
    a plurality of communication devices connected through the communication system for a communication session, including a plurality of source entities configured to send a plurality of data packets via a local area network and a plurality of destination entities configured to receive the data packets using the local area network; and
    a local area network access point configured to receive the plurality of data packets from the source entities and queue the plurality of data packets from the source entities in a separate non-interdependent queue for each destination entity for distribution, wherein:
    the data packets are queued for distribution in the separate non-interdependent queues such that data packets are distributed from the separate non-interdependent queues irrespective of both: the existence of data packets within others of the separate non-interdependent queues; and successful transmission of data packets from others of the separate non-interdependent queues; and
    each separate non-interdependent queue is associated with a single destination entity.

9. The communication system of claim 8, wherein the communication system is configured to determine an order for the destination entities and the local area network access point is configured to distribute data packets from the separate non-interdependent queues to each destination entity sequentially according to the order.

10. The communication system of claim 8, wherein:
the local area network access point includes a scheduler configured to determine an order for the destination entities; and
the local area network access point is configured to distribute the packets by transmitting the data packets in at least one transmission cycle, each transmission cycle including the local area network access point attempting transmission, for each destination entity, of a number of data packets in the separate non-interdependent queue for said destination entity, the destination entities being served sequentially according to the order until all destination entities have been served, the number of data packets not exceeding a set maximum, wherein, attempting transmission of the number of data packets to each destination entity includes checking whether transmission was successful and, if not, repeating attempting transmission until either transmission is successful or a set transmission count is exceeded.

11. The communication system of claim 10, wherein the communication system is further configured such that if the set transmission count is exceeded, the communication system marks a destination entity to which the transmission of data packets was unsuccessful with a poor coverage flag for a set time period.

12. The communication system of claim 11, wherein the poor coverage flag is removed from a destination entity when a successful transmission is made to said destination entity within the set transmission count.

13. The communication system of claim 10, wherein local area network access point is configured to update the order based on a time since each destination entity was last served, with destination entities having a longer time since service receiving a higher priority in the order.

14. The communication system of claim 10, wherein:
the destination entities are configured to optionally leave the communication session;
the communication system is configured to allow new destination entities to optionally join the communication session; and
the order is updated anytime a destination entity disconnects from or joins the communication session.

* * * * *